April 23, 1929. H. SCHLEHAN 1,710,431
BELT FASTENER
Filed Nov. 17, 1927
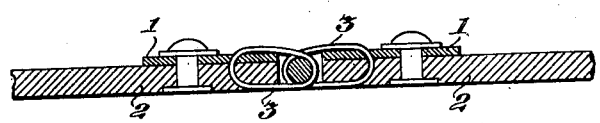
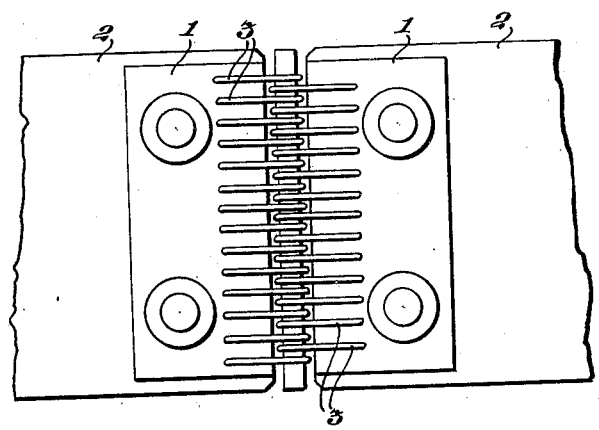

Patented Apr. 23, 1929.

1,710,431

UNITED STATES PATENT OFFICE.

HUGO SCHLEHAN, OF VIENNA, AUSTRIA.

BELT FASTENER.

Application filed November 17, 1927, Serial No. 233,961, and in Austria November 24, 1926.

The present invention relates to strap-joints especially to wire laced strap-joints. The hitherto known forms of such joints suffer under the disadvantage of being early ruptured with high tensions. This is especially the case with belts slightly rotten and particularly with textile belts.

The idea of the invention is that the spirals or other joining means of the strap-joint are drawn through the ends of the strap and at the same time through a plate of plates fastened on the ends of the strap.

An example of my invention is shown in the figures of the drawing. Fig. 1 shows a longitudinal section of the strap-joint and Fig. 2 the plan view of same.

In order to increase the resistance against the plucking out of the spirals or loops or similar joining means both ends of the strap 2 to be connected are provided with plates 1 of any suitable material, which should have a greater resistance against rupture than the straps without these plates. The plates 1 have an adequate size and they are fastened either by means of riveting or by fastening in a similar manner to the ends of the strap. The spirals or loops 3 or equivalent joining means are drawn through the plates 1 and also through the straps 2.

Naturally, my invention e. g. the fastening of the plates in the above described manner may be employed also to all other systems of strap-joints and is not limited to wire laced strap-joints.

I wish it to be understood that I do not desire to be limited to the exact details of my strap-joint shown and described for obvious modifications will occur to a person skilled in the art.

What I claim is:

1. A belt fastener including plates attached to one side only of the respective belt ends, and means for connecting the belt ends, said means extending through the plates and through the belt ends.

2. A belt fastener including plates to be fastened to one side only of the respective belt ends, and fastening means including loops passing through the belt ends and through the plates.

HUGO SCHLEHAN.